(12) United States Patent
Lin et al.

(10) Patent No.: US 10,872,083 B2
(45) Date of Patent: Dec. 22, 2020

(54) CONSTRUCTING STRUCTURED DATABASE QUERY LANGUAGE STATEMENTS FROM NATURAL LANGUAGE QUESTIONS

(71) Applicant: Microsoft Technology Licensing, LLC, Redmond, WA (US)

(72) Inventors: Yishu Lin, Mountain View, CA (US);
Wenxuan Gao, Santa Clara, CA (US);
Weidong Zhang, San Jose, CA (US);
Jimmy Hong, Belmont, CA (US);
Kapil Surlaker, Mountain View, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 135 days.

(21) Appl. No.: 16/177,026

(22) Filed: Oct. 31, 2018

(65) Prior Publication Data
US 2020/0134032 A1    Apr. 30, 2020

(51) Int. Cl.
*G06F 17/30* (2006.01)
*G06F 16/2452* (2019.01)
(Continued)

(52) U.S. Cl.
CPC .... *G06F 16/24522* (2019.01); *G06F 16/2246* (2019.01); *G06F 16/243* (2019.01); *G06F 16/2456* (2019.01); *G06F 16/284* (2019.01)

(58) Field of Classification Search
CPC ...... G06F 16/24; G06F 16/156; G06F 16/178; G05B 13/00; G06N 5/00; G06N 3/00
See application file for complete search history.

(56) References Cited

U.S. PATENT DOCUMENTS

| | | | |
|---|---|---|---|
| 10,706,045 B1 * | 7/2020 | Hasija | G06F 16/243 |
| 2003/0205638 A1 * | 11/2003 | Wier | B60R 22/405 |
| | | | 242/383.4 |

(Continued)

OTHER PUBLICATIONS

Li, et al., "Constructing an Interactive Natural Language Interface for Relational Databases", In Proceedings of the VLDB Endowment, vol. 8, No. 1, Sep. 1, 2014, pp. 73-84.

(Continued)

*Primary Examiner* — Hung D Le
(74) *Attorney, Agent, or Firm* — Hickman Palermo Becker Bingham LLP; Adam C. Stone

(57) ABSTRACT

Computer-implemented techniques for constructing structured database query language statements from natural language questions are disclosed. In some embodiments, a knowledge graph-based approach is employed to construct a structured database query language statement such as, for example, a Structure Query Language (SQL) statement, from a natural language question. The approach encompasses a domain knowledge graph model and a database schema wiring model. The domain knowledge graph model represents domain-specific knowledge about the underlying database data in the form of a graph having nodes and directed edges between the nodes. The database schema wiring model maps routes in the domain knowledge graph to database schema elements. The techniques allow a natural language interface system to accurately translate domain-specific natural language questions posed by users to structured database query language statements that can be executed against a structured database to answer the natural language question.

21 Claims, 8 Drawing Sheets

(51) Int. Cl.
    *G06F 16/242*     (2019.01)
    *G06F 16/28*     (2019.01)
    *G06F 16/22*     (2019.01)
    *G06F 16/2455*     (2019.01)

(56) References Cited

U.S. PATENT DOCUMENTS

| | | | | |
|---|---|---|---|---|
| 2005/0256889 | A1* | 11/2005 | McConnell | G06F 16/24522 |
| 2010/0250598 | A1* | 9/2010 | Brauer | G06F 16/319 |
| | | | | 707/780 |
| 2013/0226846 | A1* | 8/2013 | Li | G06N 5/02 |
| | | | | 706/12 |
| 2017/0075891 | A1* | 3/2017 | Bozkaya | G06F 16/24522 |
| 2018/0052842 | A1* | 2/2018 | Hewavitharana | G06F 40/58 |
| 2018/0165330 | A1* | 6/2018 | Halbani | G06F 16/24522 |
| 2018/0210879 | A1* | 7/2018 | Mittal | G06F 16/90344 |
| 2018/0276273 | A1* | 9/2018 | Mittal | G06F 40/30 |
| 2018/0349377 | A1* | 12/2018 | Verma | G06N 3/0454 |
| 2019/0005029 | A1* | 1/2019 | Mills | G06F 40/40 |

OTHER PUBLICATIONS

Singh, et al., "An algorithm to transform natural language into SQL queries for relational databases", In Journal of Selforganizology, vol. 3, Issue 3, Sep. 1, 2016, pp. 100-116.

Androutsopoulos, et al., "Natural Language Interfaces to Databases—An Introduction", In repository of arXiv: cmp-lg/9503016, Mar. 16, 1995, 50 Pages.

Chandra, Yohan, "Natural Language Interfaces to Databases", In Thesis prepared for the Degree of Master of Science, University of North Texas, Dec. 2006, 69 Pages.

Chen, Peter P.., "Entity-Relationship Modeling: Historical Events, Future Trends, and Lessons Learned", Published in Software Pioneers, 2002, 11 Pages.

Giordani, et al., "Translating Questions to SQL Queries with Generative Parsers Discriminatively Reranked", In Proceedings of Coling, Dec. 2012, pp. 401-410.

Iyer, et al., "Learning a Neural Semantic Parser from User Feedback", In repository of arXiv:1704.08760, Apr. 27, 2017, 11 Pages.

Zhong, et al., "SEQ2SQL: Generating Structured Queries From Natural Language Using Reinforcement Learning", In repository of arXiv:1709.00103, Nov. 9, 2017, 12 Pages.

Petrov, Slav, "Announcing SyntaxNet: The World's Most Accurate Parser Goes Open Source", Retrieved From: https://ai.googleblog.com/2016/05/announcing-syntaxnet-worlds-most.html, May 12, 2016, 6 Pages.

Popescu, et al., "High Precision Natural Language Interfaces to Databases: a Graph Theoretic Approach", In Proceedings of the Conference on Intelligent User Interfaces, Jan. 2003, 6 Pages.

Popescu, et al., "Towards a Theory of Natural Language Interfaces to Databases", In Proceedings of the 8th international Conference on Intelligent User Interfaces, Jan. 12, 2003, 9 Pages.

Wang, et al., "Pointing Out SQL Queries From Text", In the Proceedings of International Conference on Learning Representations, Apr. 30, 2018, 12 Pages.

Wong, et al., "Learning for Semantic Parsing with Statistical Machine Translation", In Proceedings of the Conference on Human Language Technology Conference of the North American Chapter of the Association of Computational Linguistics, Jun. 4, 2006, pp. 439-446.

Xu, et al., "SQLNet: Generating Structured Queries From Natural Language Without Reinforcement Learning", In repository of arXiv:1711.04436, Nov. 13, 2017, 13 Pages.

Yin, et al., "Neural Enquirer: Learning to Query Tables in Natural Language", In Proceedings of the Twenty-Fifth International Joint Conference on Artificial Intelligence, Jul. 9, 2016, 7 Pages.

Yu, et al., "TypeSQL: Knowledge-based Type-Aware Neural Text-to-SQL Generation", In Proceedings of NAACL-HLT, Jun. 1, 2018, pp. 588-594.

* cited by examiner

CONSTRUCTING STRUCTURED DATABASE QUERY LANGUAGE STATEMENTS FROM NATURAL LANGUAGE QUESTIONS

TECHNICAL FIELD

The present disclosure relates generally to computer-implemented techniques for constructing structured database query language statements from natural language questions.

BACKGROUND

A vast amount of the world's digital information is stored in structured database systems such as, for example, relational database systems. Asking questions of and getting answers from this information (i.e., querying) typically requires expertise with a structured database query language such as, for example, the Structured Query Language (SQL). In addition, domain-specific knowledge of the structure (schema) of the information in the structured database such as the names of the tables and columns containing the information of interest may be required in order to formulate a proper structured database query language statement.

As the amount of information stored in structured database systems continues to grow, the number of users that desire to query the information grows with it. Many of these users including data analysts and business intelligence analysts are not experts in—and do not desire to be experts in—structured database systems or structured database query languages. Theoretically, natural language interfaces to structured database systems could be developed that allow users to query information stored in structured database systems more naturally using a natural language query language by which users can pose questions of the information without having expertise in a structured database query language.

Constructing Structured Query Language (SQL) statements from natural language questions has been studied in the past. Early efforts centered on constructing SQL statements for semantically tractable questions using a max-flow graph match approach. A limitation of the max-flow graph match approach is its deficiency in answering non-semantically tractable natural language questions such as natural language questions containing words that are absent from a predetermined lexicon.

More recently, machine learning neural network-based approaches have been proposed. With these approaches, natural language questions and SQL statements are treated as sequences and a sequence-to-sequence model is trained and used as a parser. One issue with these approaches is that different SQL statements may be equivalent to each other due to commutativity and associativity. As a result, the order of constraints in the predicate clause (e.g., WHERE clause of SQL statements) can negatively affect the performance of sequence-to-sequence models because determining an optimal ordering of constraints is difficult. One approach to mitigate this ordering issue is to employ reinforcement learning into the sequence-to-sequence model. Other possible mitigation approaches include using a SQL sketch-based approach that employs a sequence-to-set model or that employs knowledge-based slot filling approach. Unfortunately, SQL sketch-based approaches typically suffer from the limitation that only very basic SQL statements can be constructed such as, for example, SQL statements of the form SELECT-FROM-WHERE.

Computer-implemented techniques disclosed herein address these and other issues.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Further, it should not be assumed that any of the approaches described in this section are well-understood, routine, or conventional merely by virtue of their inclusion in this section.

SUMMARY

The appended claims may serve as a useful summary of some embodiments of computer-implemented techniques for constructing structured database query language statements from natural language questions.

DETAILED DESCRIPTION

Figure 1:
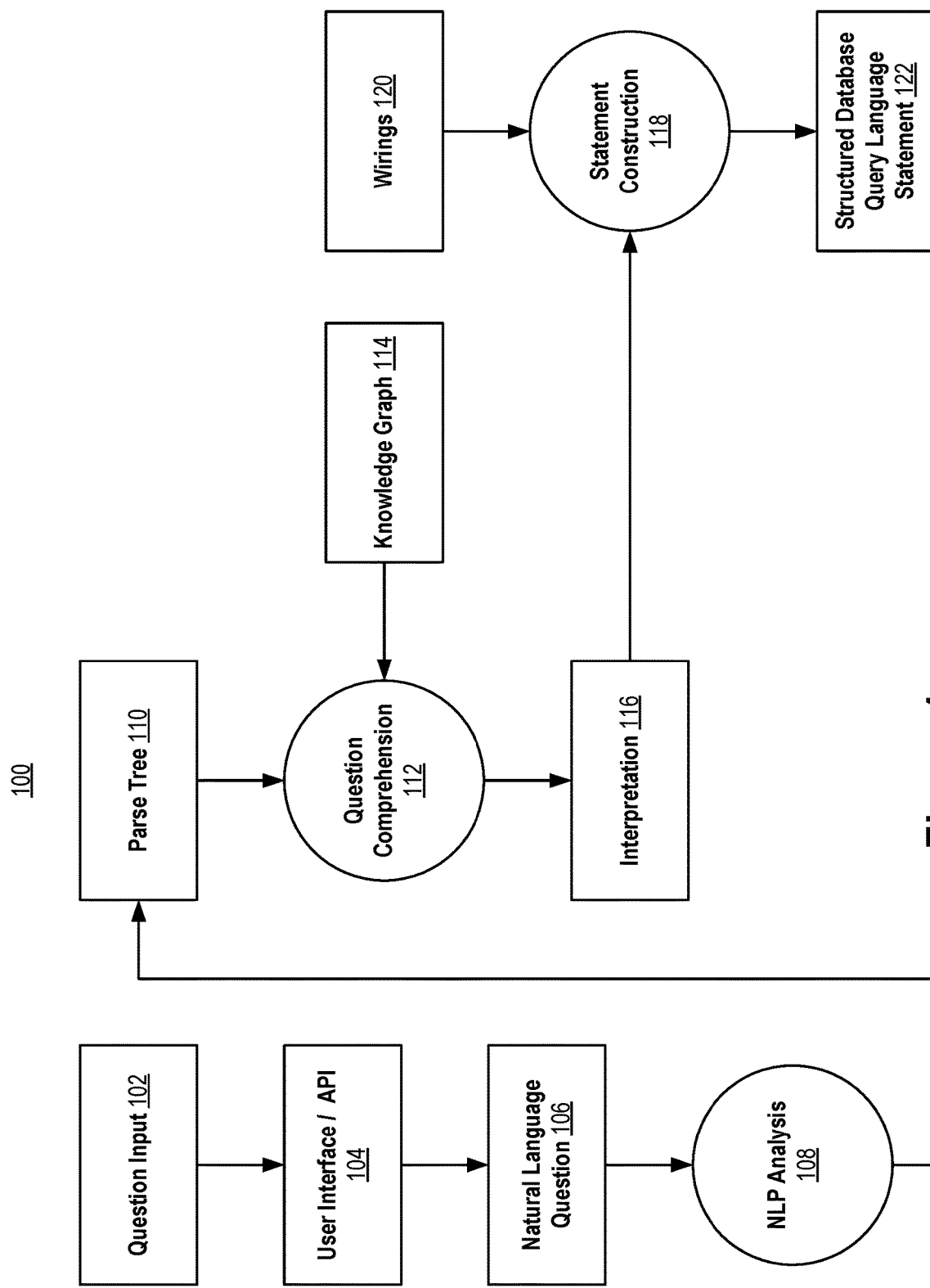
FIG. 1 depicts an example natural language interface system, according to some embodiments.

In the following detailed description, for the purposes of explanation, numerous specific details are set forth in order to provide a thorough understanding of various embodiments of computer-implemented techniques for constructing structured database query language statements from natural language questions. It will be apparent, however, that the embodiments may be practiced without these specific details. In other instances, well-known structures and devices are shown in block diagram form in order to avoid unnecessarily obscuring the embodiments.

General Overview

Computer-implemented techniques for constructing structured database query language statements from natural language questions are disclosed. In some embodiments, a knowledge graph-based approach is employed to construct a structured database query language statement such as, for example, a Structure Query Language (SQL) statement, from a natural language question. The approach encompasses a domain knowledge graph model and a database schema "wiring" model.

In some embodiments, the domain knowledge graph model represents domain-specific knowledge about the underlying database data in the form of a graph having nodes and directed edges between the nodes. Each node of the graph represents a different facet of the domain-specific knowledge. Each directed edge between two nodes represents a directional logical relation between the two facets represented by the two nodes. In some embodiments, the database schema wiring model maps "routes" in the domain knowledge graph to database schema elements. In some embodiments, the database schema elements include columns of relational database tables.

In some embodiments, the domain knowledge graph model and the database schema wiring model may be used to construct a structured database query language statement from a natural language question. Initially, a written language dependency parse tree may be generated from the natural language question. The parse tree may then be traversed and nodes in the parse tree may be recognized as corresponding to nodes in the domain knowledge graph. For this, the entity information of nodes in the parse tree may be leveraged together with the nodes of the domain knowledge graph to identify a question target of the natural language question. The natural language question may be determined to be understandable if all of the recognized nodes of the domain knowledge graph can be connected by one or more routes in the graph and the question target can be identified. In this case, a structured database query language statement may be constructed from the natural language question.

In some embodiments, the techniques for constructing a structured database query language statement from a natural language question are implemented in a natural language interface system that allows a user to pose a natural language question to the system such as, for example, by typing or otherwise inputting the question into a chat bot or other conversational dialog user interface.

In some embodiments, the techniques leverage the domain knowledge graph model to construct a structured database query language statement from a natural language question while considering conversational context. In one aspect, a natural language question posed by a user that does not mention all knowledge facets may still nevertheless be understandable by the system. In particular, implied knowledge facets may be inferred by the system for the natural language question from the domain knowledge graph model. In another aspect, a natural language question that follows a prior natural language question can be posed by the user without having to repeat knowledge facets in the follow-up question. Instead, the system may leverage conversational context to infer the missing knowledge facets from the domain knowledge graph model.

A natural language interface system that implements disclosed techniques may be improved in a number of different ways depending on the particular technique or combination of techniques implemented. First, the techniques allow users to query structured database data by posing domain-specific natural language questions of the data to the system without requiring the users to have expertise in or knowledge of the underlying structured database query language or the underlying database structure (schema) of the data, thereby improving natural language interface systems. Second, the techniques are capable of inferring hidden knowledge of domain-specific natural language questions that allows users to pose the questions to the system more easily and more conversationally, thereby improving natural language interface systems. Third, the techniques are able to leverage conversational context in a way that allows users to pose follow-up domain-specific natural language questions to the system without having to repeat knowledge facets as one might do in a human-to-human conversation, thereby improving natural language interface systems.

An implementation of the techniques may encompass performance of a method or process by a computing system having one or more processors and storage media. The one or more processors and storage media may be provided by one or more computer systems. An example computer system is described below with respect to FIG. 8. The storage media of the computing system may store one or more computer programs. The one or more computer programs may include instructions configured to perform the method or process.

In addition, or alternatively, an implementation of the techniques may encompass instructions of one or more computer programs. The one or more computer programs may be stored on one or more non-transitory computer-readable media. The one or more stored computer programs may include instructions. The instructions may be configured for execution by a computing system having one or more processors. The one or more processors of the computing system may be provided by one or more computer systems. The computing system may or may not provide the one or more non-transitory computer-readable media storing the one or more computer programs.

In addition, or alternatively, an implementation of the techniques may encompass instructions of one or more computer programs. The one or more computer programs may be stored on storage media of a computing system. The one or more computer programs may include instructions. The instructions may be configured for execution by one or more processors of the computing system. The one or more processors and storage media of the computing system may be provided by one or more computer systems.

If an implementation encompasses multiple computer systems, the computer systems may be arranged in a distributed, parallel, clustered or other suitable multi-node computing configuration in which computer systems are continuously, periodically or intermittently interconnected by one or more data communications networks (e.g., one or more interne protocol (IP) networks.)

Example Natural Language Interface System

FIG. 1 depicts an example natural language interface system 100 that implements techniques for constructing a structured database query language statement from a natural language question, according to some embodiments. The system 100 may include a user interface/application programming interface (API) 104 for receiving a question input 102. From the question input 102, the user interface/API 104 may output a natural language question 106 which may be input to a natural language processing (NLP) analysis process 108 (NLP analysis 108). The NLP analysis 108 may output a written language dependency parse tree 110 (parse tree 110) for the input natural language question 106. A question understanding process 112 (question comprehension 112) may accept the parse tree 110 and a domain knowledge graph model 114 (knowledge graph 114) as input and may provide an interpretation 116 of the natural language question 106 as output. A structured database query language statement construction process 118 (structured statement constructor 118) may accept the interpretation 116 and a database schema wiring model 120 (wirings 120) as input and may output a structured database query language statement 122 (structured statement 122). The structured statement 122 may be executed against a structured database by a structured database system to obtain an answer to the natural language question 106. The answer may be provided to a user in the user interface 104 or returned via API 104.

Returning to the top of system 100, the question input 102 may be provided by user input to the user interface 104 or may be provided by via the API 104. If the question input 102 is provided by user input, the user input may take a variety of forms including, for example, user input that enters a sequence of text characters via a character input device such as, for example, a keyboard; user input that selects a question displayed in a graphical user interface such as, for example, via a pointing device (e.g., a mouse) or via a touch sensitive surface (e.g., a touchscreen); or audible user input that is spoken by a user to a microphone (e.g., a microphone of a personal digital assistant).

If the question input 102 is provided via the API 104, it may be invoke-able by another computing system over a data network (e.g., an Internet Protocol-based network) according to an application-level data interchange format (e.g., eXtensible Markup Language (XML), JavaScript Object Notation (JSON), etc.) in which the question input 102 may be formatted in the invocation. There is no requirement, however, that the API 104 be invoke-able by a network peer computing system over a data network and the API 104 may be a programmatic API configured for intra-process communication instead. Further, there is no requirement that system 100 include both the user interface 104 and the API 104 and the system 100 may include just one or the other according to the requirements of the particular implementation at hand.

Regardless of whether the question input 102 is provided via the user interface 104 or via the API 104, the question input 102 may be used as the natural language question 106 or may be transformed to the natural language question 106. The natural language question 106 may be represented as text (i.e., a sequence of one or more characters). For example, if the question input 102 is audibly spoken by a user, then the natural language question 106 may be the output of a speech-to-text process given the question input 102 as input. As another example, the question input 102 may already be in text form and may be used directly as the natural language question 106, or the natural language question 106 may represent the result of textual pre-processing performed on the text-based question input 102 (e.g., spelling and/or grammar correction).

The rest of the system 100 may include five main components: the NLP analysis 108, the knowledge graph 114, the question comprehension 112, the wirings 120, and the structured statement constructor 118.

The knowledge graph 114 may be pre-constructed from knowledge about a particular information domain such as, for example, a particular analytic or business intelligence domain. The knowledge graph 114 can be represented in computer storage media in a variety of different ways including as an adjacency list. In general, an adjacency list representation for a graph associates each node in the graph with the collection of its neighboring edges. Many variations of adjacency list representations exist with differences in the details of how associations between nodes and collections of neighboring edges are represented, including whether both nodes and edges are supported as first-class objects in the adjacency list, and what kinds of objects are used to represent the nodes and edges.

Some possible adjacency list implementations of the knowledge graph 114 include using a hash table to associate each node in the graph with an array of adjacent nodes. In this representation, a node may be represented by a hashable node object and there may be no explicit representation of the edges as objects.

Another possible adjacency list implementation of the knowledge graph 114 involves representing the nodes by index numbers. This representation uses an array indexed by node number and in which the array cell for each node points to a singly liked list of neighboring nodes of that node. In this representation, the singly linked list pointed to by an array cell for a node may be interpreted as a node object for the node and the nodes of the singly linked list may each be interpreted as edge objects where the edge objects contain an endpoint node of the edge.

Still another possible adjacency list implementation of the knowledge graph 114 is an object-oriented one. In this implementation, each node object has an instance variable pointing to a collection object that lists the neighboring edge objects and each edge object points to the two node objects that the edge connects. The existence of an explicit edge object provided flexibility in storing additional information about edges.

The NLP analysis 108 may be applied to the natural language question 106 to parse the natural language question 106 into the parse tree 110. The question comprehension 112 may attempt to understand the natural language question 106 by examining the parse tree 110 and searching possible routes in the knowledge graph 114.

As explained in greater detail below, if the natural language question 106 is determined to be understandable by the question comprehension 112, then the interpretation 116 of the natural language question 106 may be generated by the question comprehension 112. The interpretation 116 may contain information about the natural language question 106 including, for example, a question target of the natural language question 106 in both the parse tree 110 and in the knowledge graph 114, a breakdown dimension for a "group by"-type natural language question 106, and one or more valid routes in the knowledge graph 114 for the natural language question 106.

The wirings 120 may contain bindings between the valid routes in the knowledge graph 114 and database schema elements (e.g., columns of tables) in the underlying database.

The structured statement constructor 118 may apply the wirings 120 to the interpretation 116 to construct the structured statement 122.

In some embodiments, the natural language question 106 may be understandable by the question comprehension 112 if (1) there exists a set of one or more routes in the knowledge graph 114 that cover all of the nodes of the parse tree 110 where "hidden" nodes along a route in the knowledge graph 114 may be inferred and "missing" nodes of the parse tree 110 may be inferred based on conversation context and (2) each of the one or more routes is reachable from an action node of the knowledge graph 114. As such, a natural language question 106 can be understood without imposing a tractability requirement like those that some systems require, thereby improving natural language interface systems.

Example Parse Tree

The parse tree 110 may contain linguistic structure information about the natural language question 106. The linguistic structure information may include morphology information and syntax information about each token (e.g., word)

of the natural language question 106. Morphology information about a token may encompass information about the token's internal structure in the natural language question 106. Syntax information about a token may encompass information about the role of the token in the natural language question 106.

More specifically, the morphology information of the parse tree 110 may include part of speech information on a per-token basis including part of speech tags (e.g., noun, verb, etc.), number (e.g., singular, plural, etc.), person (e.g., first, second, third, reflexive), platform (e.g., mobile), case (accusative, adverbial, etc.), tense (e.g., conditional, future, past, present, etc.), aspect (e.g., perfective, imperfective, progressive), mood (e.g., conditional, imperative, indicative, interrogative, etc.), voice (e.g., active, causative, passive), reciprocity (e.g., reciprocal, not reciprocal), proper (e.g., proper, not proper), and form (e.g., adnomial, auxiliary, complementizer, etc.). Syntactic information of the parse tree 110 may include dependency tree information that reflects the structure of the natural language question 106 including, for each given token, which other token it modifies (the given token's head token) and the syntactic relationship between the given token and its head token. The dependency tree may include a root element which typically a verb.

For example, the following is an example dependency tree for the natural language question: "How many mobile contributors contributed yesterday?"

```
[0]contributed(contribute) VERB root
+-- [3]contributors(contributor) NOUN nsubj
| +-- [5]many ADJ amod
| | +-- [6]how ADV advmod
| +-- [4]mobile ADJ amod
+-- [2]yesterday NOUN tmod
+-- [1]? PUNCT p
```

In general, the dependency tree may describe the syntactic structure of the natural language question 106 based on grammatical relations between words of the natural language question 106. For a token of the natural language question 106, an edge element of the dependency tree may identify which other token of the natural language question 106 it modifies and the type of grammatical modification. For example, in the above example dependency tree, the token "many" is an adjectival modifier of the token "contributors" which is a noun subject of the token "contributed." A dependency tree may have a single root node that corresponds to the main verb of the natural language question 106 (e.g., "contributed" in the above example).

The grammatical relationships labeled in the dependency tree may be based on a typed dependencies representation such as, for example, the typed representation described in the paper by Marie-Catherine de Marneffe and Christopher D. Manning, "The Stanford typed dependencies representation" (2008), currently available on the internet at /pubs/dependencies-coling08.pdf in the nlp.stanford.edu domain, the entire contents of which is hereby incorporated by reference. Other typed grammatical representations are possible and the parse tree 110 is not limited to any particular typed grammatical representations. For example, a multilingual representation may be used such as that described in the paper by McDonald, et al., "Universal Dependency Annotation for Multilingual Parsing" (2013), currently available on the internet at /anthology/P13-2017 in the www.aclweg.org domain, the entire contents of which is hereby incorporated by reference.

The NLP analysis 108 may obtain the parse tree 110 as output from a natural language processor that provides an application programming interface for performing analysis and annotation on input text. The NLP analysis 108 may input the natural language question 106 to the natural language processor and obtain the parse tree 110 as a result. The analysis performed by the natural language processor may be varied and may include, but is not limited to, syntactic analysis. The natural language processor may be machine learning-based. One example of a suitable natural language processor API that may be used is the analyzeSyntax( ) function of the natural language API offered by Google, Inc. of Mountain View, Calif., more information on which is currently available on the internet at /natural-language/docs/analyzing-syntax in the cloud.google.com domain. One skilled in the art will appreciate that other natural language processors and natural language processing APIs could be used according to the requirements of the particular implementation at hand.

Example Knowledge Graph

The knowledge graph 114 may be viewed as a representation layer for knowledge in a particular information domain. The knowledge graph 114 may be a directed graph with three different types of nodes (vertices): entity, action, and property. Generally, an entity node represents a thing that exists either physically or logically. For example, an entity node can represent either the object or the subject of an action. An action node may represent an operation performed by a subject or an operation performed on an object. For example, an action node may represent a verb of the natural language question 106. A property node may represent an attribute of an entity or an action.

A directed edge of the knowledge graph 114 may represent a relation between two nodes of the knowledge graph 114. The relation may have a type which may be referred to as a label for the edge (or edge label) that represents the type of relation. In some embodiments, an action node may have only outgoing edges and a property node may have only incoming edges. However, an entity node can have both incoming and outgoing edges.

Figure 2:
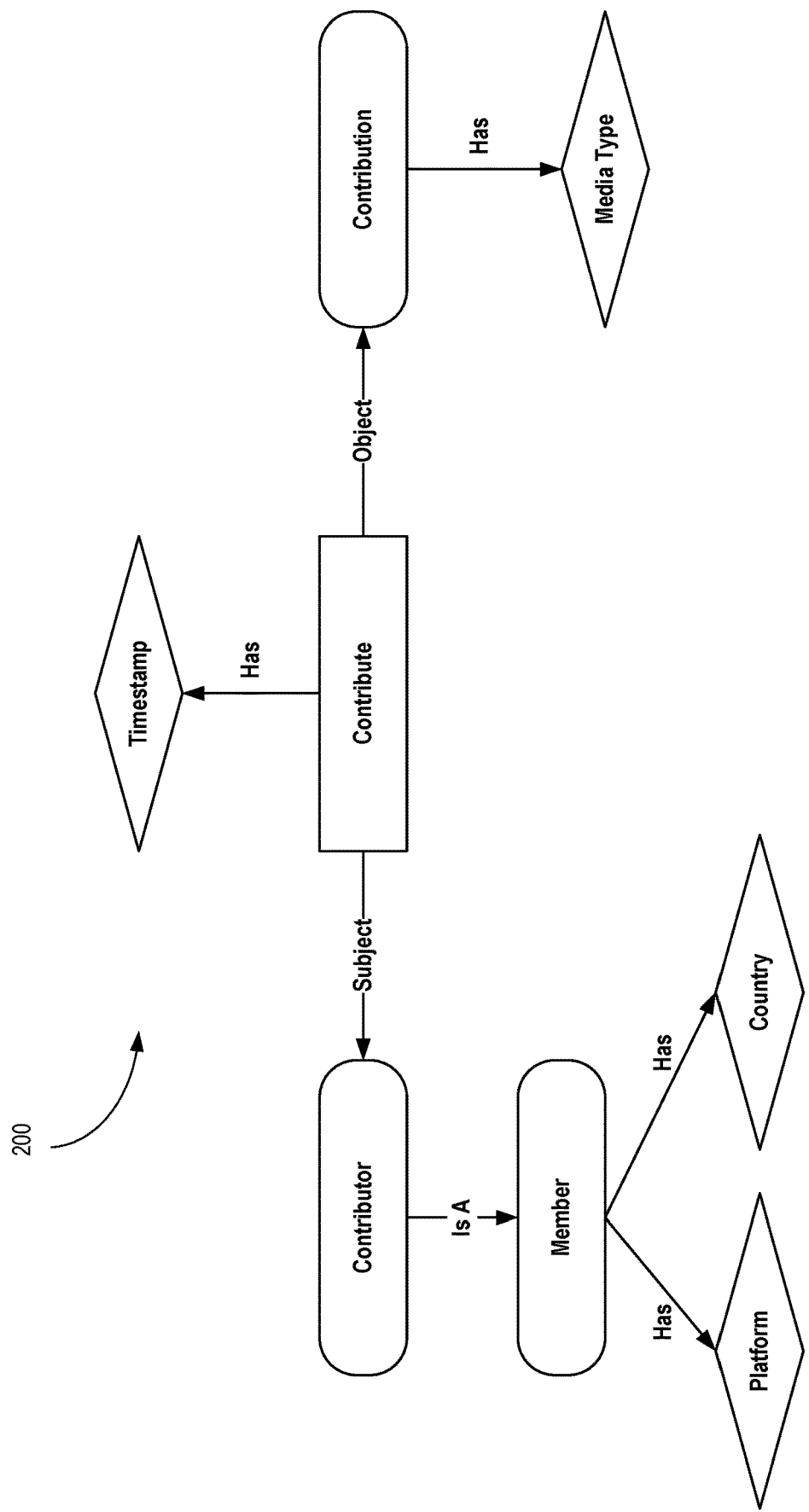
FIG. 2 depicts an example knowledge graph, according to some embodiments.

FIG. 2 depicts an example knowledge graph 200 that represents a simplified social networking contribution concept. According to the representation, a social network may be composed of "members". Members who compose a post, make a comment, or express a sentiment (e.g., a like) may be "contributors" to the social network. Those posts, comments, likes, etc. are "contributions." When a contributor makes a contribution, the contributor may be said to "contribute" to the social network. A member may have properties of "platform" and "country." A contribution may have a "media type" property that represents the type of contribution (e.g., post, comment, like, etc.).

Stated otherwise, as a description of example knowledge graph 200 according to the nodes and directed edges thereof, a contributor (entity node) may be the subject of a contribute action (action node) and a contribution (entity node) may be the object of a contribute action. A contributor may be a member (entity node) and a member may have a platform (property node) and may have a country (property node). A contribution may have a media type (property node). A contribute action may have a timestamp reflecting a date and/or time the contribute action occurred.

Before continuing the discussion of techniques for constructing the structured statement 122 from the natural language question 106, the definition of a route and a lexicon will be provided. As used in the context of the knowledge graph 114, a route is a set of connected nodes in the knowledge graph 114 where all directed edges connecting the nodes have the same direction. As used in the context of the knowledge graph 114, a lexicon is a dictionary of words or phrases associated with a node of the knowledge graph 114. For an entity node or an action node, the lexicon may be composed of the node's names or aliases. For a property node, in addition to the associated lexicon having one or more names or aliases for the node, the lexicon may also contain one or more values for the property represented by the property node. In some embodiments, lexicons associated with nodes of the knowledge graph 114 are used to find nodes in the knowledge graph 114 for that match (correspond to) nodes of the parse tree 110 of the natural language question 106.

Question Understanding

The question comprehension 112 may be configured to recognize entities, actions, and properties of the knowledge graph 114 from the parse tree 110 for the natural language question 106. This recognition may be performed by searching the lexicons associated with the nodes of the knowledge graph 114 (e.g., in an index of the lexicons) for nodes of the parse tree 110 that can be matched to a node of the knowledge graph 114. Such a node of the knowledge graph 114 to which a node of the parse tree 110 is matched is referred to herein as a "knowledge node" of the knowledge graph 114. The question comprehension 112 may determine that the natural language question 106 is understandable if: (a) a set of one or more routes in the knowledge graph 114 can be found that cover all of the knowledge nodes for the parse tree 110, and (b) the question target of the natural language question 106 can be identified.

Finding Routes in the Knowledge Graph

The question comprehension 112 may be configured to determine if one or more routes exist in the knowledge graph 114 which can connect all of the knowledge nodes for the parse tree 110. This set of routes represents the interpretation 116 of the natural language question 106 and contains information from both the knowledge graph 114 and the parse tree 110. As mentioned previously, the root of the parse tree 110 is typically a verb. Further, an action node of the knowledge graph 114 can only have outgoing directed edges. With this, an algorithm for finding routes in the knowledge graph 114 is as follows:

Generally, the parse tree 110 is traversed starting at the root in a breadth first manner and an attempt is made to match each node of the parse tree 110 to a knowledge node in the knowledge graph 114 and connect the knowledge nodes in the knowledge graph 114 to form routes. Not every node of the parse tree 110 may be matched to a knowledge node of the knowledge graph 114. In doing so, the following rules may be applied:

When connecting knowledge nodes in the knowledge graph 114, all entity nodes and property nodes shall connect to the node's lowest parent action node in the parse tree 110 if there is more than one action node in the parse tree 110 matched to a knowledge node in the knowledge graph 114.

If two knowledge nodes in the knowledge graph 114 are not directly connected but can be connected via an intermediary knowledge node in the knowledge graph 114 where a node in the parse tree 110 is not matched to the intermediary node, the intermediary knowledge node may be added to the route as a form of knowledge inference as a "hidden" knowledge node.

The natural language question 106 may be understandable (as necessary condition) if all of the knowledge nodes in the knowledge graph 114 are covered by a set of one or more routes in the knowledge graph 114 and the set of routes satisfies two conditions: (1) the set of routes covers one or more action node, and (2) each of the non-action knowledge nodes covered by the set of routes is reachable from the action node following directed edges in the knowledge graph 114. Otherwise, the natural language question 106 is not understandable.

Figure 3:
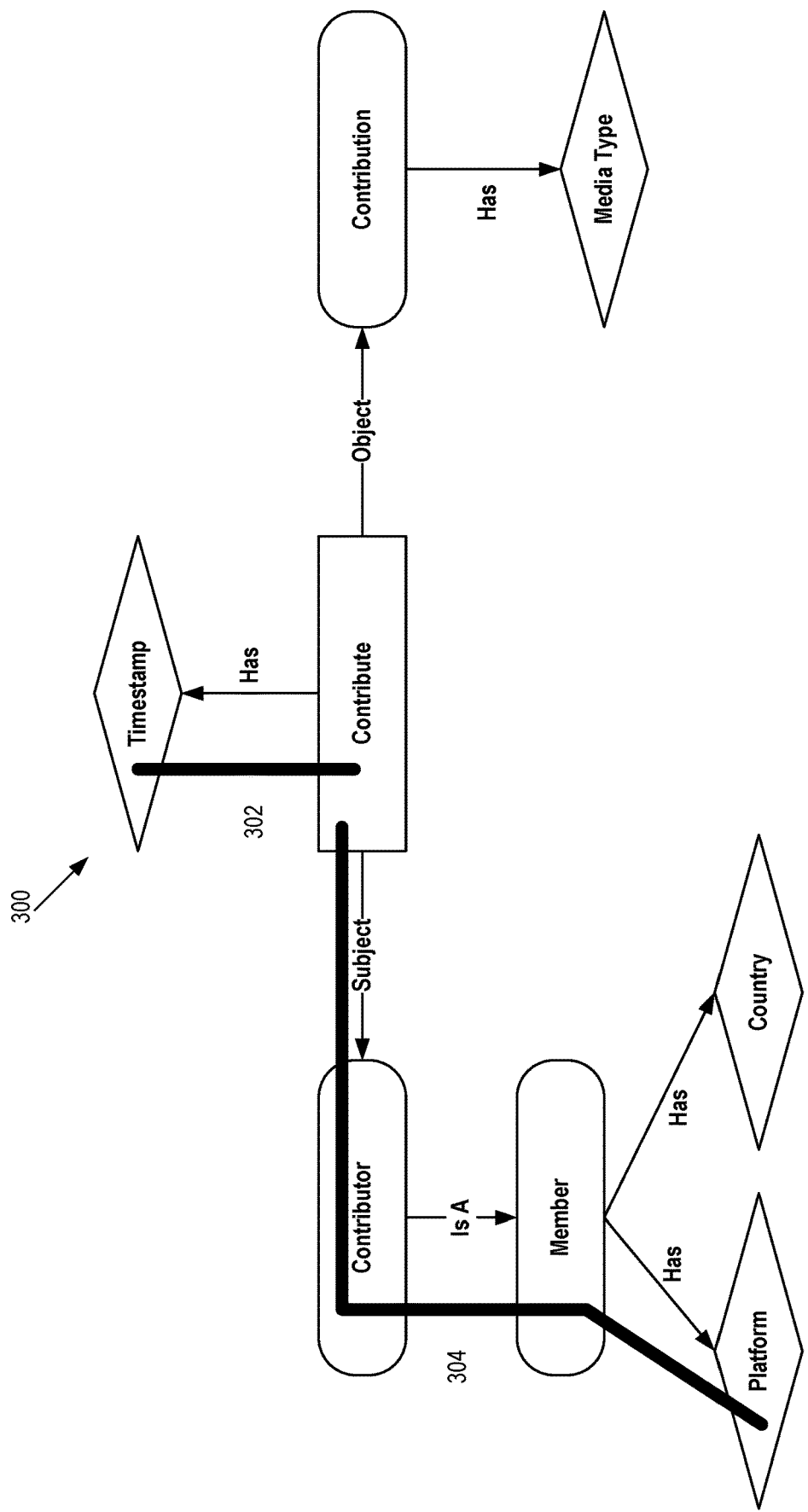
FIG. 3 depicts an example knowledge graph and showing routes in the graph representing an interpretation of a natural language question, according to some embodiments.

FIG. 3 shows an example knowledge graph 300 like example knowledge graph 200 of FIG. 1 but with found routes for the example parse tree discussed above for the natural language question: "How many mobile contributors contributed yesterday?" Here, node "[0]contributed(contribute) VERB root" of the example parse tree is matched to action knowledge node "Contribute" of knowledge graph 300. The "[3]contributors(contributor) NOUN nsubj" node of the example parse tree is matched to entity knowledge node "Contributor" of knowledge graph 300. The "[2] yesterday NOUN tmod" is matched to property knowledge node "Timestamp" of knowledge graph 330. And the "[4] mobile ADJ amod" node of the example parse tree is matched to the "Platform" property knowledge node of the knowledge graph 300.

Matching nodes of the parse tree 110 to nodes of the knowledge graph 114 may be accomplished based on the lexicons associated with the nodes of the knowledge graph 114. Such matching may be supported by indexing the nodes of the knowledge graph 114 by their associated lexicons in an inverted index that maps the words and phrases of the lexicons to the nodes the lexicons are associated with. For example, the "Contributor" node of knowledge graph 330 may be indexed by the keyword "contributor". That node may be matched to the "[3]contributors(contributor) NOUN nsubj" node of the example parse tree by using the lemma of "contributors" in the natural language question (i.e., "contributor"), which may be identified as a result of NLP analysis 108, as a key into the index.

Returning to the example of FIG. 3, there are two routes found, 302 and 304, that cover all three of the matched knowledge nodes. The "Contributor" knowledge node is connected to the "Platform" property knowledge node via the "Member" hidden knowledge node. The natural language question is understandable because all three matched knowledge nodes are covered by the routes 302 and 304, the set of routes 302 and 304 is connected to the "Contribute" action knowledge node, and each of the other non-action knowledge nodes covered by the set of routes 302 and 304 is reachable from the "Contribute" action knowledge node following directed edges in the knowledge graph 300.

Figure 4:
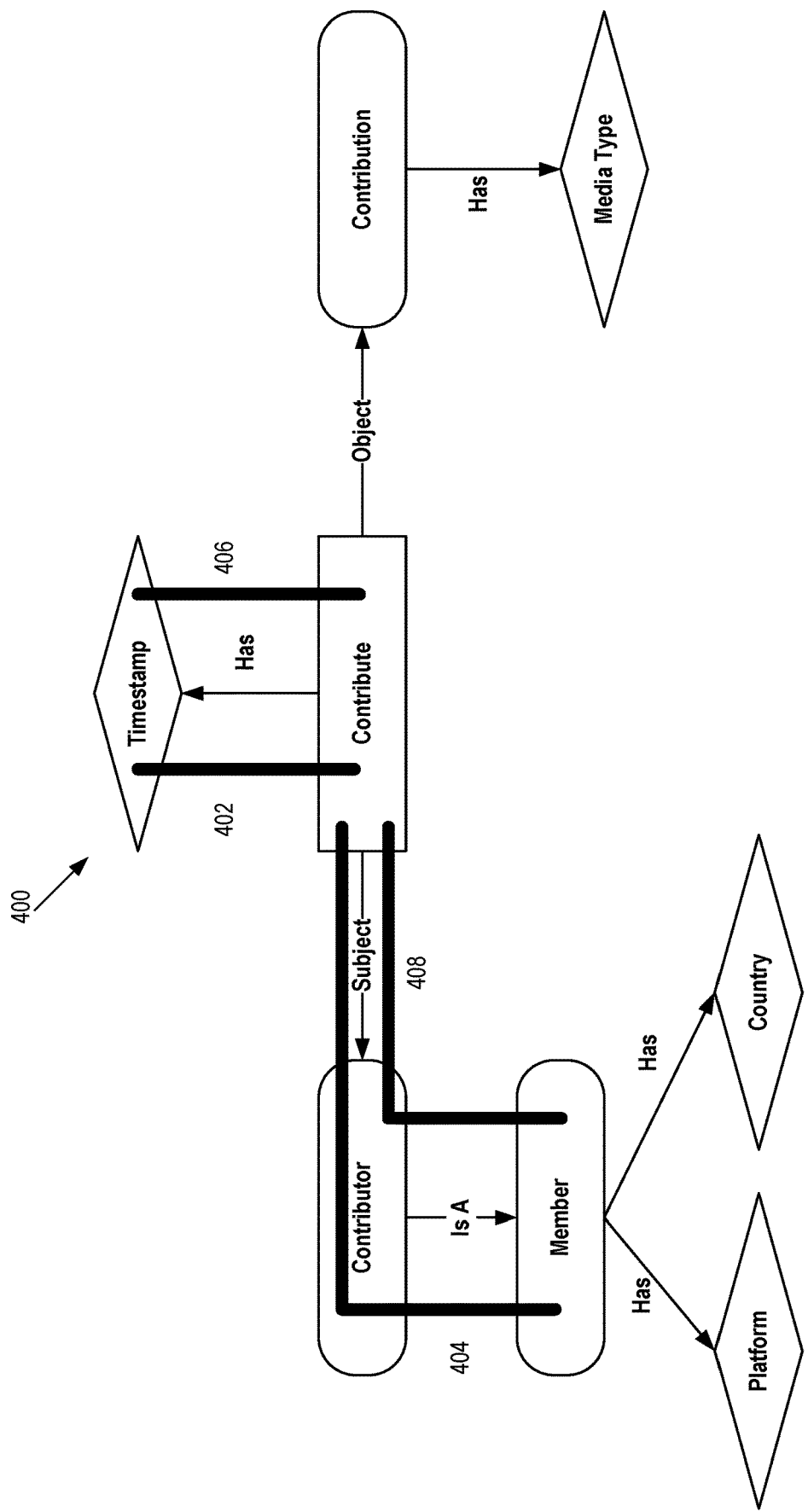
FIG. 4 depicts an example knowledge graph and showing routes in the graph representing an interpretation of a natural language question, according to some embodiments.

FIG. 4 shows another example knowledge graph 400 with routes 402, 404, 406, and 408 representing the interpretation of a natural language question. The example of FIG. 3 contains one action knowledge node in the interpretation. However, a natural language question that contains an adjective clause can result in more than one action knowledge node in the interpretation. An example of such a natural language question is: "How many members who contributed on Monday contributed again on Tuesday?" An interpretation of this question is shown in FIG. 4 in the form of routes 402, 404, 406, and 408 in knowledge graph 400. It should be noted that the "Contributor" entity knowledge node is inferred. In addition, it should be noted that there are two sets of routes because of the adjective clause in the natural language question. In some embodiments, natural language questions like this example that have two or more actions require a JOIN operation in the structured statement 122 constructed.

Inference

According to some embodiments, the natural language question 106 may be understandable even if the question 106 is not a complete sentence or contains personal pronouns. In addition, or alternatively, the natural language question 106 may be understandable even if the question 106 follows a prior understandable natural language question and does not repeat some words from the prior question that contributed to the understanding of the prior question by the question comprehension 112. This understanding is accomplished through automated inference. In particular, according to some embodiments, question comprehension 112 is configured to perform two types of automated inference: (1) inference from the knowledge graph 114 (pure inference), and (2) inference from the conversation context (conversion/context-based inference).

Examples of entity node inference from the knowledge graph 114 are described above with respect to FIG. 3 and FIG. 4. In particular, the "Member" entity node is inferred as a hidden knowledge node from knowledge graph 300 of FIG. 3 for the natural language question: "How many mobile contributors contributed yesterday?" In the example of FIG. 4, the "Contributor" entity node is inferred as a hidden knowledge node from the knowledge graph 400 for the natural language question: "How many members who contributed on Monday contributed again on Tuesday?"

In addition to inferring entity nodes from the knowledge graph 114 as hidden knowledge nodes for the natural language question 106, the question comprehension 112 may also be configured to automatically infer action nodes as hidden knowledge nodes. More specifically, an action node can be inferred as a hidden knowledge node from entity and property knowledge nodes that are reachable from the action node.

For example, in the knowledge graph 200 of FIG. 2, the "Contribute" action node may be inferred as a hidden knowledge node from the natural language question "contribution by mobile last week?" In particular, the "Contribute" action node may be inferred as a hidden knowledge node from the "Contribution" entity knowledge node, or the "Timestamp" property knowledge node, or the "Platform" property knowledge node because each of those entity and property knowledge nodes are reachable in the knowledge graph 200 from the "Contribute" action node.

The foregoing inference example is an example of inferring hidden knowledge. As practical matter, a limit on the number of action nodes that can be inferred and a limit on the depth of the hidden knowledge node may be used to prevent the extent of hidden knowledge that is inferred.

It is also possible that an action node is reachable from the entity and property knowledge nodes along multiple sets of routes that are found (e.g., there are different valid interpretations of the question). In this case, ambiguity may be introduced. To resolve the ambiguity that exists where more than one set of routes can be found, a scoring mechanism may be used to guess at the best set of routes from among the multiple sets of routes. The best guess may then be confirmed with the user (e.g., via a user interface prompt). Alternatively, all guesses or a top number (e.g., top 3) of guess may be presented in a user interface to the user as alternative choices and the user can select the guess that reflects the user's querying intention.

According to some embodiments, the scoring mechanism may be built based on machine learning techniques using features of a set of routes such as, for example, overall distance between all nodes of the set of routes, the number of hidden knowledge nodes inferred in the set of routes, among other possible features.

For example, according to some embodiments, a user may conduct a conversation with an automated chat-bot that implements techniques disclosed herein. A similar conversation may be conducted by an automated personal digital assistant wherein instead of the user providing user input and receiving chat-bot answers in the form of text in a graphic user interface, the user provides audible input (e.g., by speaking into a microphone) and receives spoken audible output (e.g., from a speaker).

According to some embodiments, context of the conversation aids automated inference when the natural language question is either an incomplete sentence or a personal pronoun is used (e.g., them). For example, consider the following conversation between a user and the automated chat-bot:

User: "How many members have sent messages since last Monday?"
Bot: (answers . . . )
User: "How about InMails?"

As explained previously, the user's second question can be completed by adding hidden knowledge nodes from the knowledge graph 200 to the interpretation of the question. Additionally, according to some embodiments, knowledge nodes from the interpretation of the user's second question can be added to the interpretation of the user's first question. For example, assuming both "InMail" and "message" are values of the "Media Type" property, the second question can be understood by substituting "message" in the user's first question with "InMails."

Consider another example:

User: "How many members have sent messages since last Monday?"
Bot: (answers . . . )
User: "How about US?"

Here, "US" in the user's second question may be a value of the "Country" property in the knowledge graph 200 of FIG. 2. As such, an initial interpretation of the user's second question without considering conversation context may cover the "Country" property node as a knowledge node. A complete understanding of the user's second question can be realized by adding the "Country" property knowledge node with value "US" in the initial interpretation of the user's second question to the interpretation of the user's first question.

Consider another example involving automated inference of a question having a personal pronoun:

User: "How many members have sent messages since last Monday?"
Bot: (answers . . . )
User: "How many of them have sent InMails?"

Here, "InMails" in the user's second question may be a value of the "Media Type" property in knowledge graph 200 of FIG. 2 which may also have a value of "message". As such, an initial interpretation of the user's second question without considering conversation context may cover the "Media Type" property node as a knowledge node. A complete understanding of the user's second question may be realized by adding the "Media Type" property knowledge node in the initial interpretation of the user's second question to the interpretation of the user's first question where the personal pronoun "them" in user's second question is inferred to refer to "members" in the user's first question and "messages" in the first question is replaced with "InMails."

Generally, an incomplete natural language question or a natural language question that contains a personal pronoun may be understood: (1) by adding hidden knowledge nodes in the knowledge graph 114 to the interpretation of the question or (2) by adding knowledge nodes of an initial interpretation of the question into the interpretation of the previous question. Both of these approaches may generate a set of multiple possible interpretations. For disambiguation of multiple possible interpretations using the scoring mechanism, pure inference and context-based (conversational-based) inference can be treated the same or similarly.

Identifying the Question Target of the Natural Language Question

The question comprehension 112 may not consider the natural language question 106 to be understood without identifying a target of the natural language question 106. The target of the natural language question 106 is also referred to herein as the "question target." Generally, the question target of the natural language question 106 is the entity being asked for by the natural language question 106. For example, consider the following two natural language questions:

Q1: How many contributors made contributions yesterday?
Q2: How many contributions were made by contributors yesterday?

The question comprehension 112 may determine the same set of routes in knowledge graph 200 for both of these questions. However, the question targets are different for the two questions. In question Q1, the question target is "contributors." In contrast, in question Q2, the question target is "contributions." As illustrated by this example, determining the question target of the natural language question 106 may be needed to understand the natural language question 106.

According to some embodiments, in order for question comprehension 112 to determine that natural language question 106 is understood, a set of predefined rules may be applied to the parse tree 110 for the natural language question 106 to determine the question target of the natural language question 106. In general, the set of predefined rules may be based largely on the structure of the parse tree 110 as opposed to all of the particular words used in the natural language question 106 so that the set of predefined rules may generically cover commonly asked questions without requiring a rule for each question.

For example, a commonly asked question may be a "how many" question as in example questions Q1 and Q2 above. The rule for identifying the question target of a how many type-question from the parse tree 110 is: if the node in the parse tree 110 for the adjectival modifier word "many" has a child node in the parse tree 110 for adverbial modifier "how" and the parent node of the "many" node in the parse tree 110 has a corresponding entity knowledge node in the knowledge graph 114, then that entity is determined to be the question target.

For example, this rule can be applied to the example parse tree below for question Q1 above to determine that "contributors" is the question target:

```
[0]made(make) VERB root
+-- [4]contributors(contributor) NOUN nsubj
|  +-- [5]many ADJ amod
|     +-- [6]how ADV advmod
+-- [3]contribution NOUN dobj
+-- [2]yesterday NOUN tmod
+-- [1]? PUNCT p
```

Similarly, this rule for "how many" questions can be applied to the example parse tree below for question Q2 above to determine that "contributions" is the question target:

```
[0]made(make) VERB root
+-- [6]contributions(contribution) NOUN nsubjpass
|  +-- [7]many ADJ amod
|     +-- [8]how ADV advmod
+-- [5]were(be) VERB auxpass
+-- [3]by ADP prep
|  +-- [4]contributors(contributor) NOUN pobj
+-- [2]yesterday NOUN tmod
+-- [1]? PUNCT p
```

Other rules can be formulated similarly for other types of questions. In addition, machine learning instead of a predefined rule set may be used to predict the question target of the natural language question 106. The input in this case may be the parse tree 110 and the entity knowledge nodes of the knowledge graph 114 for the natural language question 106. The output prediction may be the node of the parse tree 110 that is predicted by a trained machine learning model to be the question target. The model may be trained based on various features including features of example parse trees and example knowledge graphs.

Wirings

Whether a column-oriented structure database or a row oriented structured database, many structured databases organize data into one or more tables or relations of columns and rows, with a unique key identifying each row of the table it is a part of. The one or more columns of the table that provide the value(s) that unique specify a row in the table is sometimes referred to as the primary key of the table.

Figure 6:
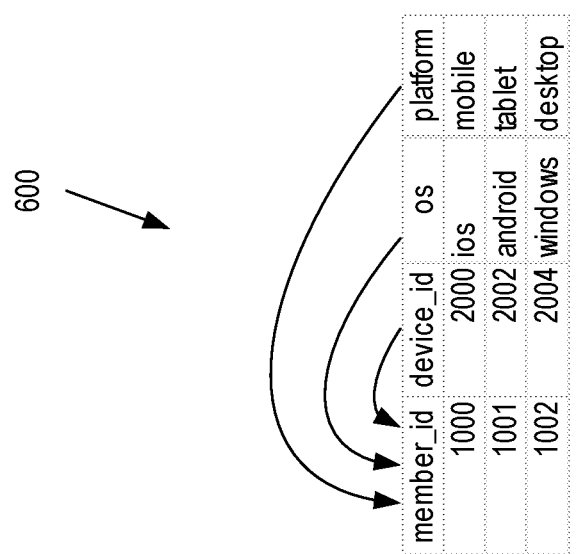
FIG. 6 depicts relations in an example structured database table, according to some embodiments.

According to some embodiments, a pair of columns of a table (a column pair) may be used to describe the relation between a column of the table and the primary key of the table. For example, FIG. 6 depicts three column-primary key relations for table 600. In this example, the primary key of table 600 is the "member_id" column. The three column-primary key relations are described by the following three columns pairs: ("member_id", "device_id"), ("member_id", "os"), and ("member_id", "platform")".

According to some embodiments, a knowledge relation in the knowledge graph 114 is described as a route or a sub-route. A knowledge relation may exist in the knowledge graph 114 between two entities or between an entity and a property. For example, the example knowledge graph 500 described the three knowledge relations as routes or sub-routes 502, 504, and 506. In particular, route or sub-route 502 describes a knowledge relation between the Member entity and the Country property, route or sub-route 504 describes a knowledge relation between the Member entity and the Device entity, and the route or sub-route 506 describes the knowledge relation between the Member entity and the Operation system entity.

According to some embodiments, in order for statement construction 118 to construct the structured statement 122, the interpretation 116 of the natural language question 106, which includes a set of routes in the knowledge graph 114 determined by the question comprehension 112, is wired to the structured database model according to the wirings 120. Each wiring of the wirings 120 may be a mapping that connects: (1) a route (R) in the knowledge graph 114 of the interpretation 116 to (2) a column pair (C) of the structured database model.

Figure 5:
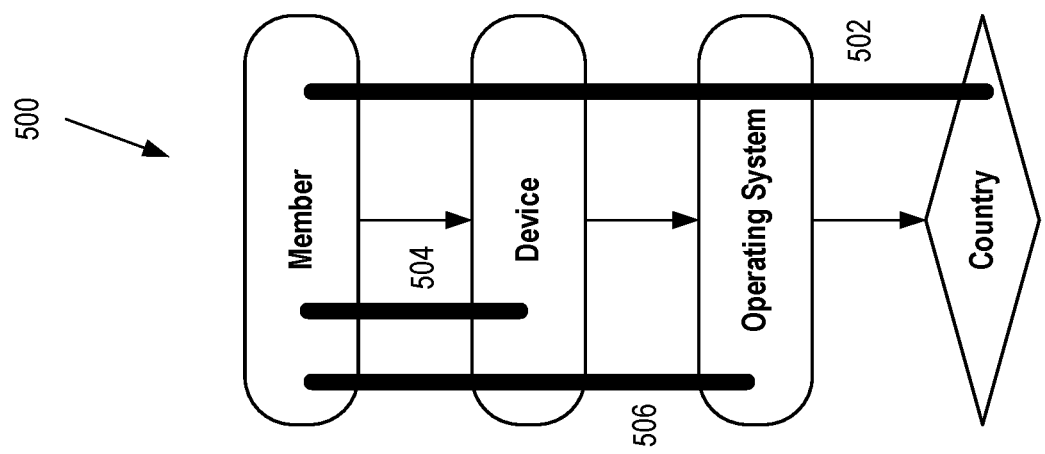
FIG. 5 depicts relations in an example knowledge graph, according to some embodiments.

For example, a set of wirings for knowledge graph 500 of FIG. 5 and table 600 of FIG. 6 might be the following:

R:[member -> device] → C:[member_id, device_id]
R:[member -> device -> os] → C:[member_id, os]
R:[member -> device -> os -> platform] → C:[member_id, platform]

In the above example set of wirings, the route or sub-route 504 in knowledge graph 500 of FIG. 5 is mapped to the column pair ("member_id", "device_id") of table 600, the route or sub-route 506 is mapped to the column pair ("member_id", "os"), and the route or sub-route 502 is mapped to the column pair ("member_id", "platform").

In the above example, the primary key of table 600 contains only one column, specifically the "member_id" column. However, a primary key of a structured database table may contain more than one column. For example, a structured database table that models a time-related relation may have a multiple column primary key. Consider the following structured database table which models the lifecycle of a user of an online service. In particular, users are categorized into different categories based on their recent activity using the online service. For example, a user may belong to category A on a first day and change categories to category B the following day.

| member_id | life_cycle_label | date |
|---|---|---|
| 10001 | Category A | 2018 Mar. 1 |
| 10001 | Category B | 2018 Mar. 2 |
| 10002 | Category C | 2018 Mar. 2 |
| ... | ... | ... |

In the above example structured database table, the primary key may be the combination of "member_id" column and the "date" column. As such, a wiring of the set of wirings 120 may have a column pair where the primary key of the column pair is a tuple of multiple columns. For example, the wiring from a knowledge graph to a column pair of the above example structure database table may be:

R:[member->life_cycle_label] → C:[<member_id, date>, life_cycle_label]

It should be noted that in a wiring of the set of wirings 120, the route of the wiring may include all nodes of a knowledge graph along the route to disambiguate from other routes in the set of wirings 120 that have the same starting and ending nodes.

Constructing the Structured Statement

Based on wiring routes of the knowledge graph 114 in the interpretation 116 of the natural language question 106 to column pairs of structured database tables, the statement constructor 120 may construct the structured statement 122. To do so, metadata about the primary key(s) and column(s) of structured database table(s) may be maintained. In particular, for a structured database table, the metadata may specify the one or more columns that make up the primary key of the table. In addition, the metadata specify a semantic type for a column of the table.

According to some embodiments, there may be four different semantic types of a column of a structured database table. A semantic type of "ID" may be specified for a column that is an identifier of an entity. A semantic type of "VALUE" may be specified as a default semantic type for a column. A semantic type of "MEASURE" may be specified for an aggregable column. A semantic type of "TIME" may be specified for a time-related column.

Initially, the statement construction 118 may access the set of wirings 120 to determine one or more wirings of the set of wirings 120 that cover all of the routes of the knowledge graph 114 in the interpretation 116 of the natural language question 106. Here, it is possible that a long route is not covered by a single wiring of the set of wirings 120. In this way, the long route may be divided into multiple smaller routes where each such smaller route is covered by a single wiring. After the statement construction 118 has identified one or more wirings in the set of wirings 120 that cover all of the routes of the knowledge graph 114 in the interpretation 116 of the natural language question 106, the statement construction 118 may proceed to constructing the structured statement 122. These one or more identified wirings that cover all of the routes in the interpretation 116 are referred to herein after as the set of coverage wirings.

To construct the structured statement 122, the statement construction 118 may divide the wirings in the set of coverage wirings into different projections of structured database tables. The statement construction 118 may then construct a structured database query language sub-query for each of the different projections. The multiple different sub-queries may then be joined together by the statement construction 118 to form the final structured statement 122.

The operation of the statement construction 118 will now be illustrated by an example. Consider the following natural language question: "How many mobile contributors contributed yesterday?" An example parse tree for this question was previously provided. Given knowledge graph 200 of FIG. 2, the routes of an interpretation of this question is depicts in FIG. 3. And in this example, the question target of the question is the "Contributor" knowledge node of knowledge graph 300.

Further assume there is a first structured database table having columns "id," "contribution_type," and "datepartition" and associated metadata and wirings maintained by the natural language interface system as depicted in the following table:

| Column Name | Semantic Type | Primary Key? | Wired route |
|---|---|---|---|
| id | ID | Y | contribute → contributor |
| contribution_type | VALUE | Y | contribute → contribution→ media_type |
| datepartition | TIME | Y | contribute → timestamp |

Further assume there is a second structured database table having columns "member_id," "country_id," and "platform_id" and associated metadata and wirings maintained by the system as depicted in the following table:

| Column Name | Semantic Type | Primary Key? | Wired route |
|---|---|---|---|
| member_id | ID | Y | |
| country_id | ID | N | member → country |
| platform_id | ID | N | member → platform |

Further assume there is a third structured database table having columns "member_id," "country_id," and "platform_id" and associated metadata and wirings as depicted in the following table:

| Column Name | Semantic Type | Primary Key? | Wired route |
|---|---|---|---|
| platform_id | ID | Y | |
| description | VALUE | N | platform |

In the knowledge graph 300 of FIG. 3, route 302 may be covered by the wiring for column "datepartition" in the first structured database table. Route 304 may not be entirely covered by a single wiring. However, two sub-routes of Contribute→Contributor→Member and Member→Platform may be covered by respective wirings for column "Id" of the first structured database table and for column "platform id" of the second structured database table. It should be noted here that since a Contributor entity is a Member entity according to knowledge graph 300, the route Contribute-→Contributor→Member may be equivalent to the route Contribute→Contributor.

In this example, there is a wiring that may cover the route Member→Platform. However, that wiring is associated with column "platform_id" in the second structured database table. The semantic type of the "platform_id" column is ID. In the natural language question, the platform property has a specified value, namely "mobile." The value of a property specified in a natural language question may be used as a condition in a projection. Accordingly, a column whose semantic type is VALUE may be used for an additional wiring. In this example the additional wiring is a single node route associated with column "description" of the third structured data table. The "description" column has a semantic type of VALUE.

Figure 7:
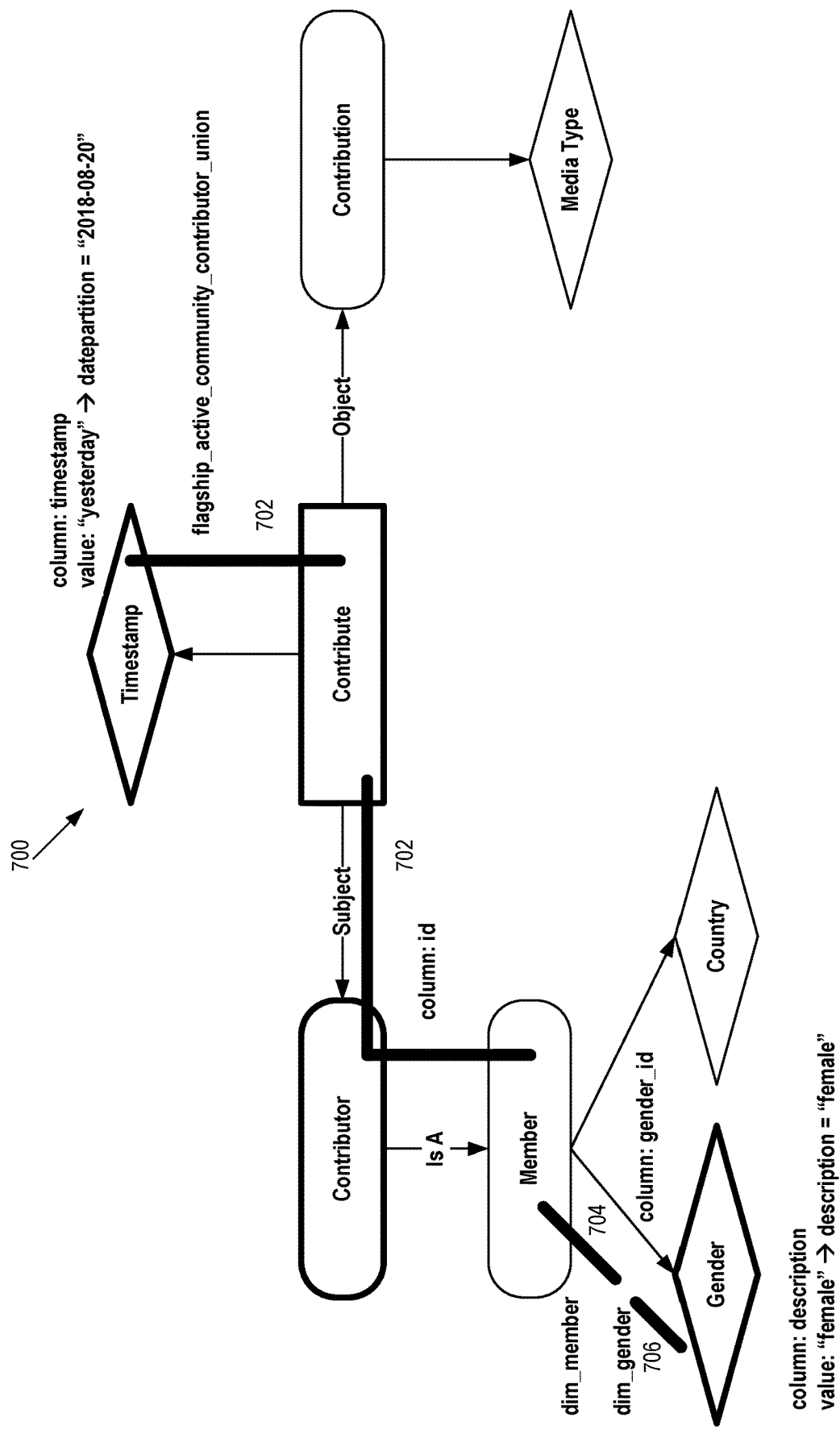
FIG. 7 depicts projections for an example knowledge graph, according to some embodiments.

As depicted in FIG. 7, route 302 and a portion of route 304 in knowledge graph 300 of FIG. 3 forms a projection 702 on the first structured database table. A remaining portion of route 304 forms a second projection 704 on the second structured database table and a third projection 706 on the third structured database table, resulting in a total of three projections 702, 704, and 706. Each projection may contain its own condition.

It should be noted that for some natural language questions, multiple projections may be formed for the same structured database table. For example, given knowledge graph 200 of FIG. 2 and the natural language question "How many members who contributed on Monday contributed again on Tuesday?", two projections may be formed on the first structured database table above depending on whether the underlying structured database tables are the same and which nodes of the parse tree are covered by routes in the knowledge graph. In this example, there are two verbs "contribute" in the question, each is a starting node in the knowledge graph of a different route. Although both routes may wire to the same column in the first structured database table, they may each result in separate projections.

Joining Projections

Once projections are formed, they may be joined to form the final structured statement 122. In the knowledge graph 114, the knowledge nodes where the routes are connected may also correspond to the columns on which the projected should be joined.

For example, as illustrated in FIG. 7, the first projection 702 for a first route Contribute→Contributor→Member may be joined with the second projection 704 for a second route Member→Platform on the Member node. The first route may be wired to column "id" on the first structured database table above and the second route may be wired to column "platform_id" on the second structured database table above. The knowledge node Member may be where the first and second routes are connected. Recall that a wiring may include a primary key (which may be made up of one or more columns of a table) and a non-primary key column of a structured database table. Given this, since the Member knowledge node is the ending node of the first route, its non-primary key column "id" may be used in the joining of the two projections 702 and 704. For the second route, the Member knowledge node is the starting node, so its primary key column "member_id" may be used in the joining of the two projections. As a result, the two projections 702 and 704 are joined on the "id" column of the first structured database table and the "member_id" column of the second structured database table. Likewise, the projections 704 and 706 may be joined on the "platform_id" column of the second structured database table and the "id" column of the third structured database table.

Once the statement construction 120 has joined the projections, the structured database question target and the database operation may be determined. As the knowledge node corresponding to the question target and the route it is on has been identified by question comprehension 112 when producing the interpretation 116, the column being wired with that route is the structured database question target. If that column's semantic type is MEASURE, a SUM or other aggregate operation may be determined to be the database operation, otherwise a COUNT (DISTINCT) operation may be determined to be the database operation.

As an example, for the example above regarding the natural language question "How many mobile contributors contributed yesterday?", the structured database question target may be the column "id" of the first structured database table, with a semantic type of ID, and the resulting structured database statement constructed in SQL form may be:

```
SELECT
    COUNT(DISTINCT v0.id)
FROM dwh.fact_contribute v0
JOIN dwh.dim_member v1 ON v0.id = v1.member_id
JOIN dwh.dim_platform v2 ON v1.platform_id = v2.id
WHERE
    v0.datepartition = '2018-08-20' AND
    lower(v2.description) = 'mobile'
;
```

It should be noted that the structured statement 122 constructed for some natural language questions 106 may contain a GROUP BY clause. The finding of a GROUP BY column may be similar to finding the structured database question target column. When structured statement 122 is constructed, a GROUP BY clause may be appended with that column and that column may be added as an additional field in the SELECT clause of the projection it is in. One skilled in the art will appreciate from the description herein that TOP and MOST natural language questions can be answered as well.

Example Conversation

Below is an example conversation between a user and chat-bot in a natural language interface system that implements techniques disclosed herein. The structured statements constructed by the system (in this example SQL statements) were executed against a relational database system to return answers (not shown). The structured statements constructed are shown below each question.

```
User: How many contributors in Feb?
Bot: <Answer>
SELECT
   COUNT(DISTINCT v0.id)
FROM dwh.fact_contribute v0
WHERE
   v0.datepartition BETWEEN '2018-02-01-00' AND '2018-02-28-00';
User: How many of them are from the United States?
Bot: <Answer>
SELECT
   COUNT(DISTINCT v0.id)
FROM dwh.fact_contribute v0
JOIN dwh.dim_member v1 ON v0.id = v1.member_sk
JOIN dwh.dim_country v2 ON v1.country_sk = v2.country_sk
WHERE
   v0.datepartition BETWEEN '2018-02-01-00' AND '2018-02-28-00'
   AND
   lower(v2.country) = 'united states';
User: What about Germany?
Bot: <Answer>
SELECT
   COUNT(DISTINCT v0.id)
FROM dwh.fact_contribute v0
JOIN dwh.dim_member v1 ON v0.id = v1.member_sk
JOIN dwh.dim_country v2 ON v1.country_sk = v2.country sk
WHERE
   v0.datepartition BETWEEN '2018-02-01-00' AND '2018-02-28-00'
   AND
   lower(v2.country) = 'germany';
User: How many of them are mobile?
Bot: <Answer>
SELECT
   COUNT(DISTINCT v0.id)
FROM dwh.fact_contribute v0
JOIN dwh.dim_member v1 ON v0.id = v1.member_sk
JOIN dwh.dim_country v2 ON v1.country_sk = v2.country_sk
JOIN dwh.dim_platform v3 ON v1 platform_sk = v3.platform_sk
WHERE
   v0.datepartition BETWEEN '2018-02-01-00' AND '2018-02-28-00'
   AND
   lower(v2.country) = 'germany' AND
   lower(v3.description) = 'mobile';
User: How many of them have responded to a message during last week?
Bot: <Answer>
SELECT
   COUNT(DISTINCT v0.responder_member_id)
FROM dwh.fact_respond v0
JOIN(
   SELECT
     DISTINCT v0c.id
   FROM dwh.fact_contribute v0c
   JOIN dwh.dim_member v1c ON v0c.id = v1c.member_sk
   JOIN dwh.dim_country v2c ON v1c.country_sk = v2c.country_sk
   JOIN dwh.dim_platform v3c ON v1c.platform_sk = v3c.platform_sk
   WHERE
     v0c.datepartition BETWEEN '2018-02-01-00' AND '2018-02-28-00'
     AND
     lower(v2c.country) = 'germany' AND
     lower(v3c.description) = 'mobile'
) v0c ON v0.responder_member_id = v0c.id
WHERE
   v0.datepartition BETWEEN '2018-02-25-00' AND '2018-03-03-00'
   AND
   lower(v0.contribution type) = 'message'
;
```

Example Computer System

Figure 8:
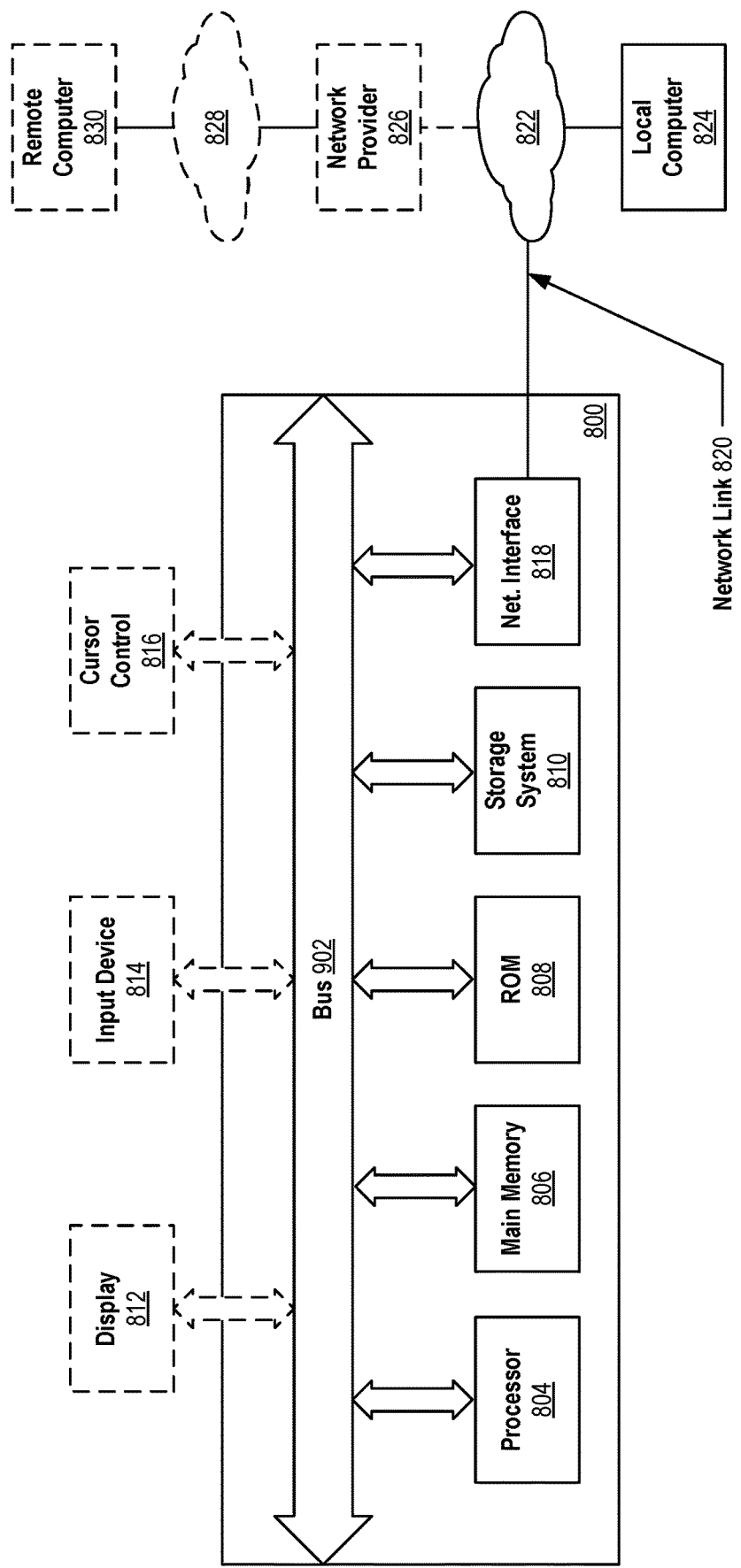
FIG. 8 depicts an example computer system that may be used in an implementation of some embodiments.

FIG. 8 is a block diagram of an example computer system 800 that may be used in an implementation of techniques disclosed herein.

Computer system 800 includes bus 802 or other communication mechanism for communicating information, and one or more hardware processors coupled with bus 802 for processing information. Hardware processor 804 may be, for example, a general-purpose microprocessor, a central processing unit (CPU) or a core thereof, a graphics processing unit (GPU), or a system on a chip (SoC).

Computer system 800 also includes a main memory 806, typically implemented by one or more volatile memory devices, coupled to bus 802 for storing information and instructions to be executed by processor 804. Main memory 806 also may be used for storing temporary variables or other intermediate information during execution of instructions by processor 804. Computer system 800 may also include read-only memory (ROM) 808 or other static storage device coupled to bus 802 for storing static information and instructions for processor 804. A storage system 810, typically implemented by one or more non-volatile memory devices, is provided and coupled to bus 802 for storing information and instructions.

Computer system 800 may be coupled via bus 802 to display 812, such as a liquid crystal display (LCD), a light emitting diode (LED) display, or a cathode ray tube (CRT), for displaying information to a computer user. Display 812 may be combined with a touch sensitive surface to form a touch screen display. The touch sensitive surface is an input device for communicating information including direction information and command selections to processor 804 and for controlling cursor movement on display 812 via touch input directed to the touch sensitive surface such by tactile or haptic contact with the touch sensitive surface by a user's finger, fingers, or hand or by a hand-held stylus or pen. The touch sensitive surface may be implemented using a variety of different touch detection and location technologies including, for example, resistive, capacitive, surface acoustical wave (SAW) or infrared technology.

Input device 814, including alphanumeric and other keys, may be coupled to bus 802 for communicating information and command selections to processor 804.

Another type of user input device may be cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Instructions, when stored in non-transitory storage media accessible to processor 804, such as, for example, main memory 806 or storage system 810, render computer system 800 into a special-purpose machine that is customized to perform the operations specified in the instructions. Alternatively, customized hard-wired logic, one or more ASICs or FPGAs, firmware and/or hardware logic which in combination with the computer system causes or programs computer system 800 to be a special-purpose machine.

A computer-implemented process may be performed by computer system 800 in response to processor 804 executing one or more sequences of one or more instructions contained in main memory 806. Such instructions may be read into main memory 806 from another storage medium, such as storage system 810. Execution of the sequences of instructions contained in main memory 806 causes processor 804 to perform the process. Alternatively, hard-wired circuitry may be used in place of or in combination with software instructions to perform the process.

The term "storage media" as used herein refers to any non-transitory media that store data and/or instructions that cause a machine to operate in a specific fashion. Such storage media may comprise non-volatile media (e.g., storage system 810) and/or volatile media (e.g., main memory 806). Non-volatile media includes, for example, read-only memory (e.g., EEPROM), flash memory (e.g., solid-state drives), magnetic storage devices (e.g., hard disk drives), and optical discs (e.g., CD-ROM). Volatile media includes, for example, random-access memory devices, dynamic random-access memory devices (e.g., DRAM) and static random-access memory devices (e.g., SRAM).

Storage media is distinct from but may be used in conjunction with transmission media. Transmission media participates in transferring information between storage media. For example, transmission media includes coaxial cables, copper wire and fiber optics, including the circuitry that comprise bus 802. Transmission media can also take the form of acoustic or light waves, such as those generated during radio-wave and infra-red data communications.

Computer system 800 also includes a network interface 818 coupled to bus 802. Network interface 818 provides a two-way data communication coupling to a wired or wireless network link 820 that is connected to a local, cellular or mobile network 822. For example, communication interface 118 may be IEEE 802.3 wired "ethernet" card, an IEEE 802.11 wireless local area network (WLAN) card, a IEEE 802.15 wireless personal area network (e.g., Bluetooth) card or a cellular network (e.g., GSM, LTE, etc.) card to provide a data communication connection to a compatible wired or wireless network. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through network 822 to local computer system 824 that is also connected to network 822 or to data communication equipment operated by a network access provider 826 such as, for example, an internet service provider or a cellular network provider. Network access provider 826 in turn provides data communication connectivity to another data communications network 828 (e.g., the internet). Networks 822 and 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the networks 822 and 828, network link 820 and communication interface 818. In the internet example, a remote computer system 830 might transmit a requested code for an application program through network 828, network 822 and communication interface 818. The received code may be executed by processor 804 as it is received, and/or stored in storage device 810, or other non-volatile storage for later execution.

Extensions And Alternatives

A new knowledge graph-based approach to constructing structured database query language statements from natural language questions is disclosed herein. As disclosed, the approach is capable of automatically inferring knowledge from the knowledge graph and from conversation context.

In the foregoing detailed description, various embodiments of constructing structured database system query statements from natural language queries system have been described with reference to numerous specific details that may vary from implementation to implementation. The specification and drawings are, accordingly, to be regarded in an illustrative rather than a restrictive sense.

The invention claimed is:

1. A method, comprising:
obtaining a parse tree of a natural language question;
based on the parse tree, identifying a plurality of routes in a domain knowledge graph, each route of the plurality of routes encompassing one or more respective nodes of the domain knowledge graph;
accessing a predefined set of a plurality of wirings to determine a plurality of coverage wirings for the plurality of routes, each coverage wiring of the plurality of coverage wirings being in the predefined set of the plurality of wirings, each coverage wiring of the plurality of coverage wirings mapping a route in the plurality of routes to a column pair, the column pair pairing a primary key of a respective structured database table with a non-primary key column of the respective structured database table;
constructing a structured database query language statement based on the plurality of coverage wirings; and
causing the structured database query language statement to be executed against a structured database.

2. The method of claim 1, wherein the structured database query language statement is a Structured Query Language (SQL) statement and the structured database is a relational database.

3. The method of claim 1, wherein the identifying the plurality of routes in the domain knowledge graph based on the parse tree is based on:
traversing nodes of the parse tree;
matching nodes of the parse tree to nodes of the domain knowledge graph; and
identifying nodes in the domain knowledge graph matched to nodes of the parse tree that are connected in the domain knowledge graph.

4. The method of claim 1, wherein the constructing the structured database query language statement based on the plurality of coverage wirings is based on:
identifying a first route in the domain knowledge graph associated with a first coverage wiring of the plurality of coverage wirings;
identifying a second route in the domain knowledge graph associated with a second coverage wiring of the plurality of coverage wirings;

determining that the first route ends at a same node in the domain knowledge graph that the second route starts from; and constructing a join relation for inclusion in the structured database query language statement based on: (a) the non-primary key column of the column pair of the first coverage wiring and (b) the primary key of the column pair of the second coverage wiring.

5. The method of claim 1, wherein the identifying the plurality of routes in the domain knowledge graph based on the parse tree is based on:

traversing nodes of the parse tree;

matching nodes of the parse tree to nodes of the domain knowledge graph;

automatically inferring a particular node of the domain knowledge graph based on nodes of the domain knowledge graph to which nodes of the parse tree are matched;

based on the automatically inferring the particular node, adding the particular node to a particular route of the plurality of routes based on the automatically inferring;

wherein, after the adding the particular node to the particular route, the particular route comprises a first node of the domain knowledge graph, a second node of the domain knowledge graph, and the particular node;

wherein the first node of the domain knowledge graph is matched to a node of the parse tree;

wherein the second node of the domain knowledge graph is matched to a node of the parse tree; and wherein the particular node of the domain knowledge graph is not matched to a node of the parse tree but is automatically inferred to be part of the particular route based on connecting the first node and the second node in the domain knowledge graph via the particular node.

6. The method of claim 1, wherein the plurality of routes is a first plurality of routes; wherein the natural language question is a first natural language question; and the identifying the plurality of routes in the domain knowledge graph for the first natural language question based on the parse tree is based on:

obtaining a second plurality of routes in the domain knowledge graph determined for a second natural language question that occurred prior to the first natural language question in a conversation;

identifying one or more preliminary routes in the domain knowledge graph for the first natural language question; and adding a node from a route of the one or more preliminary routes for the first natural language question to a route of the second plurality of routes for the second natural language question to form a route of the first plurality of routes for the first natural language question.

7. The method of claim 1, wherein each node of the domain knowledge graph represents an entity, an action, or a property; and wherein a node of the domain knowledge graph is associated with a lexicon, the lexicon for the node specifying a name or alias for the node.

8. One or more non-transitory computer-readable media storing one or more programs for execution by a computing system having one or more processors and storage media, the one or more programs comprising instructions configured for:

obtaining a parse tree of a natural language question;

based on the parse tree, identifying a plurality of routes in a domain knowledge graph, each route of the plurality of routes encompassing one or more respective nodes of the domain knowledge graph;

accessing a predefined set of a plurality of wirings to determine a plurality of coverage wirings for the plurality of routes, each coverage wiring of the plurality of coverage wirings being in the predefined set of the plurality of wirings, each coverage wiring of the plurality of coverage wirings mapping a route in the plurality of routes to a column pair, the column pair pairing a primary key of a respective structured database table with a non-primary key column of the respective structured database table;

constructing a structured database query language statement based on the plurality of coverage wirings; and causing the structured database query language statement to be executed against a structured database.

9. The one or more non-transitory computer-readable media of claim 8, wherein the structured database query language statement is a Structured Query Language (SQL) statement and the structured database is a relational database.

10. The one or more non-transitory computer-readable media of claim 8, wherein the identifying the plurality of routes in the domain knowledge graph based on the parse tree is based on:

traversing nodes of the parse tree;

matching nodes of the parse tree to nodes of the domain knowledge graph; and identifying nodes in the domain knowledge graph matched to nodes of the parse tree that are connected in the domain knowledge graph.

11. The one or more non-transitory computer-readable media of claim 8, wherein the constructing the structured database query language statement based on the plurality of coverage wirings is based on:

identifying a first route in the domain knowledge graph associated with a first coverage wiring of the plurality of coverage wirings;

identifying a second route in the domain knowledge graph associated with a second coverage wiring of the plurality of coverage wirings;

determining that the first route ends at a same node in the domain knowledge graph that the second route starts from; and constructing a join relation for inclusion in the structured database query language statement based on: (a) the non-primary key column of the column pair of the first coverage wiring and (b) the primary key of the column pair of the second coverage wiring.

12. The one or more non-transitory computer-readable media of claim 8, wherein the identifying the plurality of routes in the domain knowledge graph based on the parse tree is based on:

traversing nodes of the parse tree;

matching nodes of the parse tree to nodes of the domain knowledge graph;

automatically inferring a particular node of the domain knowledge graph based on nodes of the domain knowledge graph to which nodes of the parse tree are matched;

based on the automatically inferring the particular node, adding the particular node to a particular route of the plurality of routes based on the automatically inferring;

wherein, after the adding the particular node to the particular route, the particular route comprises a first node of the domain knowledge graph, a second node of the domain knowledge graph, and the particular node;

wherein the first node of the domain knowledge graph is matched to a node of the parse tree;

wherein the second node of the domain knowledge graph is matched to a node of the parse tree; and wherein the particular node of the domain knowledge graph is not matched to a node of the parse tree but is automatically inferred to be part of the particular route based on connecting the first node and the second node in the domain knowledge graph via the particular node.

13. The one or more non-transitory computer-readable media of claim 8, wherein the plurality of routes is a first plurality of routes; wherein the natural language question is a first natural language question; and the identifying the plurality of routes in the domain knowledge graph for the first natural language question based on the parse tree is based on:

obtaining a second plurality of routes in the domain knowledge graph determined for a second natural language question that occurred prior to the first natural language question in a conversation;

identifying one or more preliminary routes in the domain knowledge graph for the first natural language question; and adding a node from a route of the one or more preliminary routes for the first natural language question to a route of the second plurality of routes for the second natural language question to form a route of the first plurality of routes for the first natural language question.

14. The one or more non-transitory computer-readable media of claim 8, wherein each node of the domain knowledge graph represents an entity, an action, or a property; and wherein a node of the domain knowledge graph is associated with a lexicon, the lexicon for the node specifying a name or alias for the node.

15. A computing system, comprising:
one or more processors;
storage media; and
one or more programs stored in the storage media and configured for execution by the one or more processors, the one or more programs comprising instructions configured for:
obtaining a parse tree of a natural language question;
based on the parse tree, identifying a plurality of routes in a domain knowledge graph, each route of the plurality of routes encompassing one or more respective nodes of the domain knowledge graph;
accessing a predefined set of a plurality of wirings to determine a plurality of coverage wirings for the plurality of routes, each coverage wiring of the plurality of coverage wirings being in the predefined set of the plurality of wirings, each coverage wiring of the plurality of coverage wirings mapping a route in the plurality of routes to a column pair, the column pair pairing a primary key of a respective structured database table with a non-primary key column of the respective structured database table;
constructing a structured database query language statement based on the plurality of coverage wirings; and
causing the structured database query language statement to be executed against a structured database.

16. The computing system of claim 15, wherein the structured database query language statement is a Structured Query Language (SQL) statement and the structured database is a relational database.

17. The computing system of claim 15, wherein the identifying the plurality of routes in the domain knowledge graph based on the parse tree is based on:

traversing nodes of the parse tree;
matching nodes of the parse tree to nodes of the domain knowledge graph; and
identifying nodes in the domain knowledge graph matched to nodes of the parse tree that are connected in the domain knowledge graph.

18. The computing system of claim 15, wherein the constructing the structured database query language statement based on the plurality of coverage wirings is based on:

identifying a first route in the domain knowledge graph associated with a first coverage wiring of the plurality of coverage wirings;
identifying a second route in the domain knowledge graph associated with a second coverage wiring of the plurality of coverage wirings;
determining that the first route ends at a same node in the domain knowledge graph that the second route starts from; and
constructing a join relation for inclusion in the structured database query language statement based on: (a) the non-primary key column of the column pair of the first coverage wiring and (b) the primary key of the column pair of the second coverage wiring.

19. The computing system of claim 15, wherein the identifying the plurality of routes in the domain knowledge graph based on the parse tree is based on:

traversing nodes of the parse tree;
matching nodes of the parse tree to nodes of the domain knowledge graph;
automatically inferring a particular node of the domain knowledge graph based on nodes of the domain knowledge graph to which nodes of the parse tree are matched;
based on the automatically inferring the particular node, adding the particular node to a particular route of the plurality of routes based on the automatically inferring;
wherein, after the adding the particular node to the particular route, the particular route comprises a first node of the domain knowledge graph, a second node of the domain knowledge graph, and the particular node;
wherein the first node of the domain knowledge graph is matched to a node of the parse tree;
wherein the second node of the domain knowledge graph is matched to a node of the parse tree; and
wherein the particular node of the domain knowledge graph is not matched to a node of the parse tree but is automatically inferred to be part of the particular route based on connecting the first node and the second node in the domain knowledge graph via the particular node.

20. The computing system of claim 15, wherein the plurality of routes is a first plurality of routes; wherein the natural language question is a first natural language question; and the identifying the plurality of routes in the domain knowledge graph for the first natural language question based on the parse tree is based on:

obtaining a second plurality of routes in the domain knowledge graph determined for a second natural language question that occurred prior to the first natural language question in a conversation;
identifying one or more preliminary routes in the domain knowledge graph for the first natural language question; and
adding a node from a route of the one or more preliminary routes for the first natural language question to a route of the second plurality of routes for the second natural language question to form a route of the first plurality of routes for the first natural language question.

21. The computing system of claim 15, wherein each node of the domain knowledge graph represents an entity, an action, or a property; and wherein a node of the domain knowledge graph is associated with a lexicon, the lexicon for the node specifying a name or alias for the node.

* * * * *